US011969692B2

(12) United States Patent
Suzuki et al.

(10) Patent No.: US 11,969,692 B2
(45) Date of Patent: Apr. 30, 2024

(54) METHOD OF PRODUCING SEPARATION MEMBRANE

(71) Applicant: ZEON CORPORATION, Tokyo (JP)

(72) Inventors: Takahiro Suzuki, Tokyo (JP); Shiori Omori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 516 days.

(21) Appl. No.: 17/310,714

(22) PCT Filed: Feb. 18, 2020

(86) PCT No.: PCT/JP2020/006355
§ 371 (c)(1),
(2) Date: Aug. 19, 2021

(87) PCT Pub. No.: WO2020/175247
PCT Pub. Date: Sep. 3, 2020

(65) Prior Publication Data
US 2022/0184560 A1 Jun. 16, 2022

(30) Foreign Application Priority Data

Feb. 28, 2019 (JP) ................................. 2019-035520

(51) Int. Cl.
| | | |
|---|---|---|
| *B01J 29/06* | (2006.01) | |
| *B01D 67/00* | (2006.01) | |
| *B01D 69/10* | (2006.01) | |
| *B01D 71/02* | (2006.01) | |
| *B01J 29/035* | (2006.01) | |
| *B01J 29/40* | (2006.01) | |
| *B01J 35/00* | (2006.01) | |
| *B01J 35/30* | (2024.01) | |
| *C01B 37/02* | (2006.01) | |
| *C01B 39/48* | (2006.01) | |
| *B01J 29/60* | (2006.01) | |
| *B01J 29/66* | (2006.01) | |

(52) U.S. Cl.
CPC ....... *B01D 67/0051* (2013.01); *B01D 69/108* (2022.08); *B01D 71/0281* (2022.08); *B01J 29/035* (2013.01); *B01J 29/06* (2013.01); *B01J 29/40* (2013.01); *B01J 35/00* (2013.01); *B01J 35/30* (2024.01); *C01B 37/02* (2013.01); *C01B 39/48* (2013.01); *B01J 29/60* (2013.01); *B01J 29/66* (2013.01); *B01J 2229/60* (2013.01); *B01J 2229/66* (2013.01)

(58) Field of Classification Search
CPC B01D 53/228; B01D 71/0281; B01D 71/028; B01D 67/0051; B01D 67/0046; B01D 69/10; B01D 69/108; B01D 69/105; B01D 69/1213; B01D 2323/219; C01B 37/02; C01B 39/40; C01B 39/48; B01J 35/00; B01J 35/30; B01J 37/0215; B01J 37/0217; B01J 37/0221; B01J 37/0225; B01J 37/0228; B01J 37/035; B01J 37/10; B01J 29/06; B01J 29/035; B01J 29/40; B01J 2229/60; B01J 2229/66
USPC ................................. 502/4, 60, 77; 423/709
See application file for complete search history.

(56) References Cited

U.S. PATENT DOCUMENTS

| | | | |
|---|---|---|---|
| 5,763,347 | A | 6/1998 | Lai |
| 8,258,069 | B2 | 9/2012 | Mizuno |
| 11,179,681 | B2 | 11/2021 | Omori et al. |
| 2017/0368509 | A1 | 12/2017 | Nagasaka et al. |
| 2018/0200679 | A1 | 7/2018 | Omori et al. |

FOREIGN PATENT DOCUMENTS

| | | |
|---|---|---|
| CN | 101028605 A | 9/2007 |
| CN | 101252983 A | 8/2008 |
| JP | H10506363 A | 6/1998 |
| JP | 2010120834 A | 6/2010 |
| JP | 2010142809 A | 7/2010 |
| JP | 2016190200 A | 11/2016 |
| WO | 2011072215 A1 | 6/2011 |
| WO | 2012018007 A1 | 2/2012 |
| WO | 2016121377 A1 | 8/2016 |
| WO | 2018181349 A1 | 10/2018 |

OTHER PUBLICATIONS

Oct. 23, 2023, Communication pursuant to Article 94(3) EPC issued by the European Patent Office in the corresponding European Patent Application No. 20762324.0.
Teng Yuan et al., Micro/Nanoscale Structured Superhydrophilic and Underwater Superoleophobic Hybrid-Coated Mesh for High-Efficiency Oil/Water Separation, Polymers, Jun. 19, 2020, vol. 12, No. 6, XP093092258.
Wei Xiao et al., A simple seeding method for MFI zeolite membrane synthesis on macroporous support by microwave heating, Microporous and Mesoporous Materials, Nov. 21, 2010, pp. 154-160, vol. 142, No. 1, XP028163802.
Apr. 28, 2020, International Search Report issued in the International Patent Application No. PCT/JP2020/006355.

(Continued)

Primary Examiner — Elizabeth D Wood
(74) Attorney, Agent, or Firm — KENJA IP LAW PC

(57) ABSTRACT

A method of producing a separation membrane includes a seed crystal adhesion step of adhering zeolite seed crystals to a porous support formed of stainless steel to obtain a seed crystal-bearing support and a separation layer formation step of forming a porous separation layer formed of a zeolite on the seed crystal-bearing support. The stainless steel has a contact angle with water of 90° or more. The seed crystal adhesion step includes bringing the zeolite seed crystals and a solvent having a contact angle with the stainless steel of 30° or less into contact with the porous support.

5 Claims, 1 Drawing Sheet

(56) References Cited

OTHER PUBLICATIONS

Aug. 25, 2021, International Preliminary Report on Patentability issued in the International Patent Application No. PCT/JP2020/006355.

Yong Peng et al., Preparation of zeolite MFI membranes on defective macroporous alumina supports by a novel wetting-rubbing seeding method: Role of wetting agent, Journal of Membrane Science, 2013, pp. 60-69, vol. 444.

Oct. 17, 2022, the Extended European Search Report issued by the European Patent Office in the corresponding European Patent Application No. 20762324.0.

Hideyuki Negishi et al., Preparation of Tubular Silicalite Membranes by Hydrothermal Synthesis with Electrophoretic Deposition as a Seeding Technique, Journal of the American Ceramic Society, Sep. 13, 2005, pp. 124-130, vol. 89, No. 1.

Aug. 4, 2022, Office Action issued by the Intellectual Property Office of Singapore in the corresponding Singaporean Patent Application No. 11202108990U.

Sep. 27, 2023, Office Action issued by the Intellectual Property Office of Viet Nam in the corresponding Vietnamese Patent Application No. 1-2021-04988.

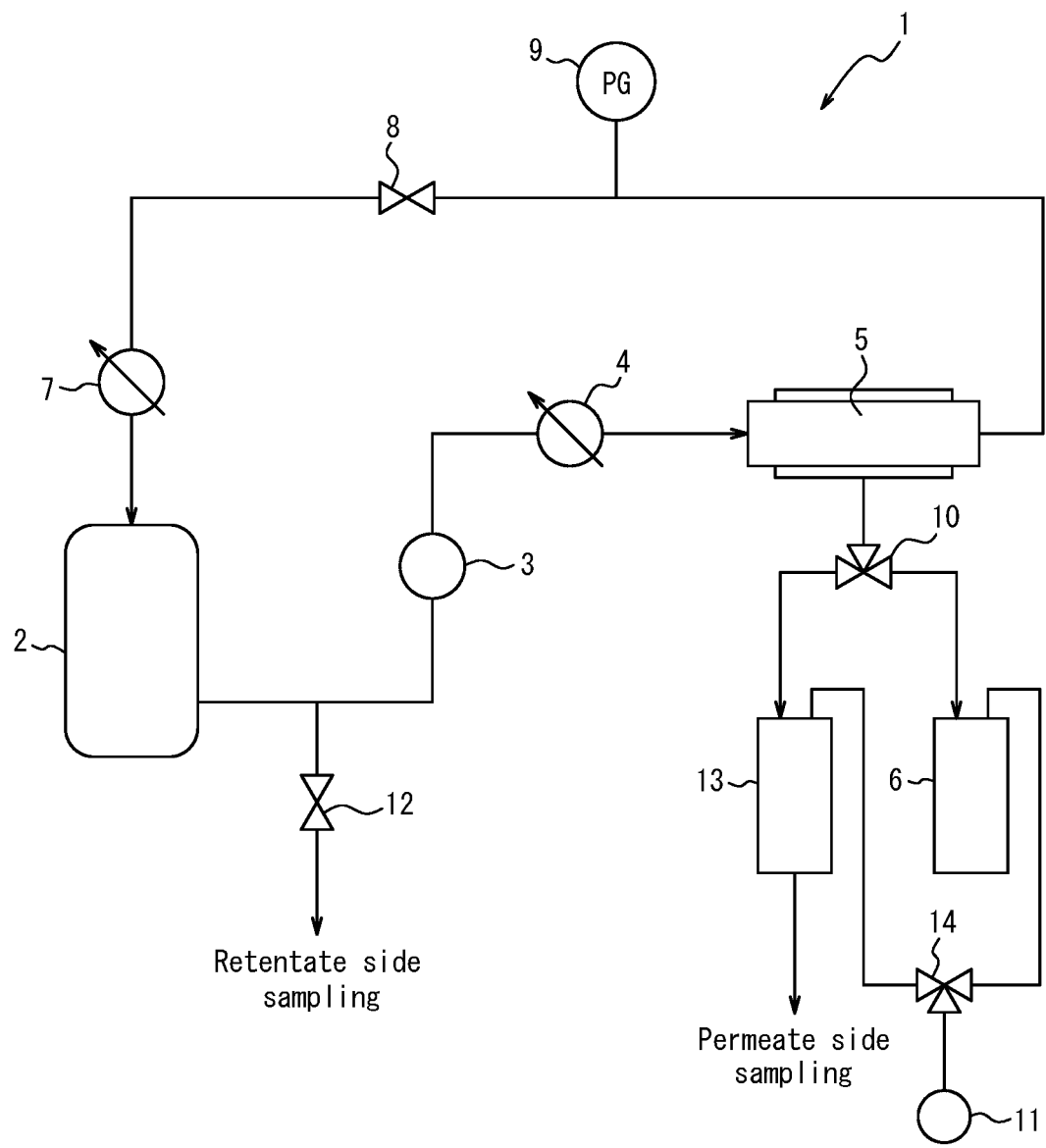

METHOD OF PRODUCING SEPARATION MEMBRANE

TECHNICAL FIELD

The present disclosure relates to a method of producing a separation membrane. In particular, a presently disclosed method of producing a separation membrane can suitably be used in production of a separation membrane that can suitably be used to separate one or more hydrocarbons from a hydrocarbon mixture.

BACKGROUND

Membrane separation is conventionally used as a low-energy method for separating a branched hydrocarbon from a hydrocarbon mixture containing linear and branched hydrocarbons of equivalent carbon number. Zeolite membranes that are obtained by forming a zeolite in a film-like form on a support are widely used as separation membranes.

For example, Patent Literature (PTL) 1 discloses a method of forming a zeolite membrane in which a porous metal support is pretreated with a non-volatile detergent, is washed and dried, and is subsequently subjected to final treatment with an acid, and then zeolite seed crystals are mounted or adhered to a section that has undergone final treatment, and a zeolite membrane is formed. According to this method of forming a zeolite membrane, a zeolite membrane can be formed on the surface of a porous metal support made of stainless steel.

CITATION LIST

Patent Literature

PTL 1: JP2010-142809A

SUMMARY

Technical Problem

However, a method of forming a zeolite membrane that includes final treatment of a porous metal support with an acid as in the conventional method described above has complicated operations and long treatment time. Moreover, particularly in instances in which a porous metal support formed of stainless steel having excellent mechanical strength, stability, and so forth has been used, it has been difficult to form a separation membrane that can display sufficient separation performance without undergoing treatment with an acid such as described above.

Accordingly, an object of the present disclosure is to provide a method of producing a separation membrane that does not require complicated operations and long treatment time and that enables production of a separation membrane that includes a porous support formed of stainless steel and that has excellent separation performance.

Solution to Problem

The inventors conducted diligent studies to achieve the object set forth above. As a result, the inventors reached a new finding that by adhering zeolite seed crystals to a porous support formed of stainless steel using a specific solvent and then synthesizing a zeolite on the porous support, it is possible to form a separation membrane without the need for complicated operations and long treatment time. The inventors also confirmed that the obtained separation membrane enables good separation of a linear hydrocarbon and a branched hydrocarbon of equivalent carbon number, and, in this manner, completed the present disclosure.

Specifically, the present disclosure aims to advantageously solve the problem set forth above, and a presently disclosed method of producing a separation membrane comprises: a seed crystal adhesion step of adhering zeolite seed crystals to a porous support formed of stainless steel to obtain a seed crystal-bearing support; and a separation layer formation layer of forming a porous separation layer formed of a zeolite on the seed crystal-bearing support, wherein the stainless steel has a contact angle with water of 90° or more, and the seed crystal adhesion step includes bringing the zeolite seed crystals and a solvent having a contact angle with the stainless steel of 30° or less into contact with the porous support. By adhering zeolite seed crystals using a solvent that has a contact angle with stainless steel forming the porous support of 30° or less and then synthesizing a zeolite on the porous support to form a porous separation layer in this manner, it is possible to produce a separation membrane having excellent separation performance without the need for complicated operations and long treatment time. Note that the term "zeolite" as used in the present specification refers to a Si-containing compound having a porous structure. Moreover, the "contact angle with water" of stainless steel can be measured by a method described in the EXAMPLES section. Furthermore, the "contact angle with stainless steel" of a solvent can be measured by a method described in the EXAMPLES section.

In the seed crystal adhesion step of the presently disclosed method of producing a separation membrane, the seed crystal-bearing support can be obtained by wetting the porous support with the solvent and subsequently rubbing the zeolite seed crystals against the porous support. By rubbing the zeolite seed crystals against the wetted porous support, the zeolite seed crystals can be adhered to the porous support in high density.

Moreover, in the seed crystal adhesion step of the presently disclosed method of producing a separation membrane, the seed crystal-bearing support can be obtained by bringing the support and a slurry composition containing the zeolite seed crystals and the solvent into contact. By bringing the slurry composition and the porous support into contact to obtain the seed crystal-bearing support, it is possible to produce a separation membrane more efficiently.

In the presently disclosed method of producing a separation membrane, the solvent preferably includes an alcohol having a carbon number of 5 or less. When the solvent used in the seed crystal adhesion step includes an alcohol having a carbon number of 5 or less, there is high affinity between the zeolite seed crystals and the solvent, and the zeolite seed crystals can be stably adhered to the porous support.

In the presently disclosed method of producing a separation membrane, the solvent preferably has a purity of 95 volume % or higher. When the purity of the solvent is 95 volume % or higher, there is even higher affinity between the zeolite seed crystals and the solvent, and the zeolite seed crystals can be more stably adhered to the porous support.

Advantageous Effect

According to the present disclosure, it is possible to provide a method of producing a separation membrane that does not require complicated operations and long treatment time and that enables production of a separation membrane that includes a porous support formed of stainless steel and that has excellent separation performance.

BRIEF DESCRIPTION OF THE DRAWING

In the accompanying drawing,

FIG. 1 illustrates the schematic configuration of a test apparatus used in an example and a comparative example.

DETAILED DESCRIPTION

The following provides a detailed description of embodiments of the present disclosure.

The presently disclosed method of producing a separation membrane enables good production of a separation membrane that can suitably be used to separate one or more hydrocarbons from a hydrocarbon mixture, and, more specifically, can suitably be used in membrane separation of a hydrocarbon mixture that contains a linear hydrocarbon and also contains a branched hydrocarbon and/or cyclic hydrocarbon of equivalent carbon number to the linear hydrocarbon.

(Method of Producing Separation Membrane)

The presently disclosed method of producing a separation membrane includes a seed crystal adhesion step of adhering zeolite seed crystals to a porous support formed of stainless steel to obtain a seed crystal-bearing support and a separation layer formation step of forming a porous separation layer formed of a zeolite on the seed crystal-bearing support. The presently disclosed method of producing a separation membrane may optionally also include a step of preparing the zeolite seed crystals (seed crystal preparation step). These steps are described below in detail. Note that compounds, etc., that are given as examples of components that can be used in these steps may each be one type thereof used individually or a plurality of types thereof used as a mixture. In a case in which a plurality of types is used, the total amount thereof preferably satisfies quantitative ratios described at various points.

<Seed Crystal Preparation Step>

In the seed crystal preparation step, zeolite seed crystals are produced using a known zeolite seed crystal production method without any specific limitations. Note that in the seed crystal preparation step, the zeolite seed crystals can be produced in accordance with a known method by, for example, heating an aqueous sol for seed crystals obtained by mixing a silica source, a structure directing agent, and water so as to produce coarse crystals of a zeolite by hydrothermal synthesis, and then optionally performing drying and pulverization of the obtained coarse crystals (for example, refer to WO2016/121377A1).

The average particle diameter of the zeolite seed crystals is preferably 50 nm or more, and is preferably 700 nm or less, more preferably 600 nm or less, and even more preferably 550 nm or less. When the average particle diameter of the zeolite seed crystals is within any of the ranges set forth above, a porous separation layer having good properties can be formed, and separation selectivity can be further improved.

The "average particle diameter of zeolite seed crystals" can be determined by calculating the number average of particle diameters of 20 zeolite seed crystals measured using a scanning electron microscope (SEM).

<Seed Crystal Adhesion Step>

In the seed crystal adhesion step, the zeolite seed crystals are adhered to a porous support formed of stainless steel to obtain a seed crystal-bearing support. Features of the presently disclosed method of producing a separation membrane are that the stainless steel forming the porous support has a contact angle with water of 90° or more and that the zeolite seed crystals and a solvent having a contact angle with the stainless steel of 30° or less are brought into contact with the porous support in the seed crystal adhesion step. The inclusion of these features means that through the presently disclosed method of producing a separation membrane, it is possible to produce a separation membrane that includes a porous support formed of stainless steel and that has excellent separation performance without the need for complicated operations and long treatment time. Each element in this step is described below in detail.

<<Porous Support Formed of Stainless Steel>>

The porous support formed of stainless steel is a porous body that includes a plurality of pores and is formed of stainless steel. The term "stainless steel" refers to steel that contains 10.5 mass % or more of chromium, and, more specifically, refers to stainless steel that is in accordance with ISO 15510 (carbon content of 1.2 mass % or less prescribed in addition to the aforementioned chromium content; same applies for JIS G 0203). The stainless steel may, for example, be SUS (Steel Use Stainless) 304, SUS316, SUS316L, or the like, but is not specifically limited thereto.

The contact angle with water of the stainless steel serving as a constituent material of the porous support is required to be 90° or more, and is preferably 92° or more, and more preferably 95° or more. Untreated stainless steel that has not been surface treated with an acid or the like generally has a contact angle with water of 90° or more, and, in particular, can have a contact angle with water of 95° or more. The contact angle with water of untreated stainless steel can be reduced through acid treatment. When stainless steel has a lower contact angle with water, this means that the stainless steel has high affinity with water compared to stainless steel having a high contact angle with water. Consequently, in a case in which a support formed of stainless steel for which the contact angle with water has been reduced through acid treatment or the like is used, it is expected that a seed crystal-bearing support can be obtained without the need to bring the support into contact with a solvent having a contact angle with stainless steel of 30° or less. Conversely, when stainless steel having a high contact angle with water of 90° or more is used, seed crystals cannot be adhered well to the support by a conventional seed crystal adhesion method in which water is used as a solvent due to this stainless steel displaying water repellency. Therefore, by adopting the presently disclosed method of producing a separation membrane with respect to a porous support satisfying the condition set forth above, it is possible to stably adhere zeolite seed crystals to a porous support formed of stainless steel, and thus a porous separation layer can be formed well on the porous support and a separation membrane having excellent separation performance can be formed.

Note that the contact angle with water of the stainless steel can normally be 99° or less, but is not specifically limited thereto.

The porous support formed of stainless steel may have any shape such as a flat film shape, a flat plate shape, a tube shape, or a honeycomb shape without any specific limitations.

The average pore diameter of the porous support formed of stainless steel is preferably 0.01 μm or more, more preferably 0.05 μm or more, even more preferably 0.07 μm or more, and particularly preferably 0.1 μm or more, and is preferably 1.5 μm or less, more preferably 1.2 μm or less, and even more preferably 1.0 μm or less. When the average pore diameter of the porous support formed of stainless steel is within any of the ranges set forth above, a separation membrane having even better separation performance can be produced. Note that the average pore diameter of the porous support formed of stainless steel can be measured by mercury intrusion porosimetry.

The porous support formed of stainless steel is preferably a porous support for which the ratio of the average particle diameter of the zeolite seed crystals relative to the average pore diameter of the porous support is not less than 0.01 and not more than 3.0. Formation efficiency of a porous membrane separation layer can be improved by setting the ratio of the average particle diameter of the zeolite seed crystals and the average pore diameter of the porous support formed of stainless steel within the range set forth above. Although the reason for this is not clear, it is presumed that when zeolite seed crystals having the average particle diameter set forth above and a porous support having the average pore diameter set forth above are used, the zeolite seed crystals enter the pores of the porous support, which suitably restricts the direction of zeolite growth and thereby facilitates formation of a porous separation layer.

<<Solvent Having Contact Angle with Stainless Steel of 30° or Less>>

The contact angle with stainless steel of the solvent is required to be 30° or less, and is preferably 20° or less. When the contact angle with stainless steel of the solvent is 20° or less, affinity of the solvent with the porous support formed of stainless steel can be further increased. Note that the contact angle with stainless steel of the solvent can normally be 5° or more.

The solvent having a contact angle with stainless steel of 30° or less may be a solvent including at least one from among alcohols, inclusive of alcohols having a carbon number of 5 or less such as methanol, ethanol, butanol, propanol, pentanol, and isomers thereof; ketones such as acetone and methyl ethyl ketone; and hydrocarbon compounds such as toluene and hexane, but is not specifically limited thereto. Of these solvents, alcohols having a carbon number of 5 or less are preferable from a viewpoint of affinity with the zeolite seed crystals. When affinity of the zeolite seed crystals and the solvent is high, the zeolite seed crystals can be stably adhered to the porous support. Note that although a mixed solvent of a plurality of the compounds described above can be used as the solvent, a single solvent is more preferably used as the solvent.

The purity of the solvent is preferably 95 volume % or higher, and more preferably 97 volume % or higher. When the purity of the solvent is not lower than any of the lower limits set forth above, there is even higher affinity between the zeolite seed crystals and the solvent, and the zeolite seed crystals can be more stably adhered to the porous support. Note that examples of impurities that can be mixed into the solvent include impurities and the like that are unavoidably mixed into the solvent during production thereof.

<<Adhesion Method of Zeolite Seed Crystals>>

The following two methods are given as examples of methods by which the zeolite seed crystals can be adhered to the porous support formed of stainless steel to obtain a seed crystal-bearing support in this step.

(1) The porous support is wetted with the solvent, and the zeolite seed crystals are subsequently rubbed against the porous support to obtain the seed crystal-bearing support in the seed crystal adhesion step.

(2) The porous support and a slurry composition containing the zeolite seed crystals and the solvent are brought into contact to obtain the seed crystal-bearing support in the seed crystal adhesion step.

More specifically, the zeolite seed crystals can be adhered to the porous support in a method in accordance with (1) by wetting the porous support with the solvent in advance by immersing the porous support in the solvent for 1 minute to 60 minutes, and then rubbing the zeolite seed crystals against the porous support that has been wetted with the solvent. This method enables adhesion of the zeolite seed crystals to the porous support in high density. Note that the zeolite seed crystals that are rubbed are preferably in a dry state that does not substantially contain a solvent component or the like used in synthesis of the seed crystals. The phrase "does not substantially contain a solvent component or the like" means that the content of a solvent component or the like used in synthesis of the seed crystals is 0.5 mass % or less. Moreover, the term "rub" means that the zeolite seed crystals are applied to the surface of the porous support while applying external force in at least a thickness direction.

Examples of methods in accordance with (2) include methods such as "coating", "filtration", and "impregnation". More specifically, in the case of "coating", the zeolite seed crystals can be adhered to the porous support by coating the porous support with a slurry composition obtained by moistening the zeolite seed crystals with the solvent, and then drying the applied slurry composition. In the case of "filtration", the zeolite seed crystals can be adhered to the porous support by using the porous support to filter a slurry composition obtained by dispersing the zeolite seed crystals in the solvent. In the case of "impregnation", the zeolite seed crystals can be adhered to the porous support through 1 minute to 60 minutes of impregnation of the porous support with a slurry composition obtained by dispersing the zeolite seed crystals in the solvent. Of these methods, it is preferable to select "filtration" from among methods in accordance with (2) from a viewpoint of producing a separation membrane with high production efficiency. Moreover, when an alcohol having a carbon number of 5 or less, from among the previously described solvents having a contact angle with stainless steel of 30° or less, is used as the solvent of a slurry composition used in any of these methods, the zeolite seed crystals can be dispersed well in the slurry composition, and the zeolite seed crystals can be uniformly adhered to the porous support.

<<Operation Conditions>>

When adhering the zeolite seed crystals to the porous support formed of stainless steel in this step, it is preferable that the various operations are performed in a closed system rather than in an open system. This is in order to avoid a situation in which the desired effect of the operations cannot be obtained due to volatilization of the solvent having a contact angle with stainless steel of 30° or less during the operations. In particular, the importance of performing the various operations in a closed system is high in a case in which a method using a slurry composition in accordance with (2) is adopted in the adhesion method of the zeolite seed crystals. Volatilization of the solvent from the slurry composition causes reduction of dispersibility of the zeolite seed crystals in the slurry composition during operations. Therefore, by performing the various operations of a method in accordance with (2) in a closed system, it is possible to inhibit volatilization of the solvent and inhibit reduction of dispersibility of the zeolite seed crystals in the slurry composition during operations, and, as a result, it is possible to stably adhere the zeolite seed crystals to the porous support.

<<Drying Method>>

The zeolite seed crystals that have been adhered to the porous support formed of stainless steel in accordance with any of the methods set forth above can be fixed to the porous support by removing the solvent through drying. The drying temperature during this drying is not specifically limited but is preferably 50° C. or higher, and more preferably 70° C. or higher, and is preferably 150° C. or lower, and more preferably 100° C. or lower.

<Separation Layer Formation Step>

In the separation layer formation step, the seed crystal-bearing support obtained in the step set forth above is immersed in an aqueous sol containing a silica source and a structure directing agent, and a zeolite is synthesized by hydrothermal synthesis to form a porous separation layer on the porous support. A separation membrane obtained by forming the porous separation layer on the porous support in the separation layer formation step may be optionally subjected to boil washing and/or firing treatment. Note that production of the aqueous sol, hydrothermal synthesis of the zeolite, and optional boil washing and firing treatment in the separation layer formation step can be implemented in accordance with known methods without any specific limitations (for example, refer to WO2016/121377A1).

<<Properties of Separation Layer>>

The separation layer obtained as set forth above is a porous separation layer formed of a zeolite. The "zeolite" forming the porous separation layer preferably has an MFI-type porous structure and contains Si in its framework. When the zeolite forming the porous separation layer has this structure, a separation membrane having even better separation performance can be obtained.

<Separation Performance of Separation Membrane>

A separation membrane produced in accordance with the presently disclosed method of producing a separation membrane (hereinafter, also referred to as the "present separation membrane") has excellent separation performance in separation of one or more hydrocarbons from a hydrocarbon mixture. The hydrocarbon mixture is, more specifically, a mixture that contains a linear hydrocarbon and also contains a branched hydrocarbon and/or cyclic hydrocarbon of equivalent carbon number to the linear hydrocarbon. In particular, the present separation membrane has excellent separation performance with respect to a mixture containing, as main components, a linear hydrocarbon and a branched hydrocarbon and/or cyclic hydrocarbon each having a carbon number of 4, such as a C4 fraction produced as a by-product in production of ethylene through thermal cracking of naphtha or a fraction remaining after recovery of at least some butadiene from a C4 fraction. The present separation membrane also has excellent separation performance with respect to a mixture containing, as main components, a linear hydrocarbon and a branched hydrocarbon and/or cyclic hydrocarbon each having a carbon number of 5, such as a C5 fraction produced as a by-product in production of ethylene through thermal cracking of naphtha or a fraction remaining after recovery of at least some isoprene from a C5 fraction.

Note that the phrase "containing as main components" indicates that 50 mol % or more, in total, of the linear hydrocarbon and the branched hydrocarbon and/or cyclic hydrocarbon are contained.

EXAMPLES

The following provides a more specific description of the present disclosure based on examples. However, the present disclosure is not limited to the following examples. In the following description, "%" and the like used to express quantities are by mass, unless otherwise specified. Also note that pressures are gauge pressures.

In each example or comparative example, the average particle diameter of zeolite seed crystals, various contact angles, and the separation performance of a separation membrane were measured and evaluated by the following methods.

<Average Particle Diameter of Zeolite Seed Crystals>

The particle diameters of 20 zeolite seed crystals were measured using a scanning electron microscope (SEM). The average value of the measured values was calculated and was taken to be the average particle diameter of the zeolite seed crystals.

<Contact Angle>

A 50 mm×30 mm plate sample formed of stainless steel used as a formation material of a porous support in each example or comparative example was used as a test specimen. Each contact angle was measured by the sessile drop method (liquid volume: 2 μL) using a contact angle meter (Portable Contact Angle Meter PCA-11 produced by Kyowa Interface Science Co., Ltd.).

<Separation Performance>

The results of a membrane separation test described further below were used to calculate the permeation flux F using the following equation (I). The separation factor α was calculated using the following equation (II). The product (F×α) of the separation factor α and the permeation flux F was calculated, and separation performance was evaluated based on this value. A larger value for F×α indicates better separation performance.

$$F[kg/(m^2 \cdot h)] = W/(A \times t) \quad (I)$$

$$\alpha = (Y_n/Y_{bc})/(X_n/X_{bc}) \quad (II)$$

Note that in equation (I), W is the mass [kg] of permeate that has passed through the separation membrane, A is the effective area [m$^2$] of the separation membrane, and t is the processing time [h]. In equation (II), $X_n$ is the proportional content [mol %] of linear hydrocarbon in a feedstock, $X_{bc}$ is the proportional content [mol %] of branched hydrocarbon and cyclic hydrocarbon in the feedstock, $Y_n$ is the proportional content [mol %] of linear hydrocarbon in a permeate side sample, and $Y_{bc}$ is the proportional content [mol %] of branched hydrocarbon and the cyclic hydrocarbon in the permeate side sample.

In acquisition of the permeate side sample, the sampling time was set as 10 minutes as described further below. Each value for a point X minutes after the start of the test was calculated using a sample acquired such that the point after X minutes was a midpoint in the sampling time of 10 minutes.

Example 1

<Production of Aqueous Sol for Seed Crystals>

A magnetic stirrer was used to mix 152.15 g of a tetrapropylammonium hydroxide aqueous solution (produced by Tokyo Chemical Industry Co., Ltd.) of 22.5 mass % in concentration (34.23 g in terms of tetrapropylammonium hydroxide as structure directing agent) and 48.44 g of ultrapure water. In addition, 99.41 g of tetraethoxysilane (produced by Sigma-Aldrich) was added as a silica source and was mixed therewith at room temperature for 70 minutes by the magnetic stirrer to produce an aqueous sol for seed crystal production.

<Production of Zeolite Seed Crystals>

The aqueous sol for seed crystals was loaded into a stainless steel pressure-resistant vessel including a fluororesin inner cylinder, and then a reaction (hydrothermal synthesis) was carried out for 48 hours in a 130° C. hot-air dryer. Next, solid-liquid separation of the resultant reaction liquid was performed for 30 minutes by centrifugal separation in a centrifugal separator (4,000 rpm), and solid content was collected. The collected solid content was dried for 12 hours in an 80° C. thermostatic dryer. The obtained dry solid was ground in a mortar and was then heated to 500° C. at a heating rate of 2° C./min in an electric furnace and was held at 500° C. for 20 hours to remove structure directing agent remaining in the zeolite seed crystals and thereby obtain zeolite seed crystals. It was confirmed that the obtained zeolite seed crystals had an MFI-type structure by X-ray diffraction measurement. Note that the zeolite seed crystals had an average particle diameter of 400 nm. Also note that the obtained zeolite seed crystals were in a dry state that did not substantially contain water (water content of 0.5 mass % or less).

<Seed Crystal Adhesion Step>

In a seed crystal adhesion step, a seed crystal-bearing support was obtained by wetting a porous support formed of stainless steel with a solvent and then rubbing the zeolite seed crystals against the porous support.

Specifically, a porous support made of stainless steel that had a circular tube shape (stainless steel: SUS304; external diameter: 10 mm; thickness: 2.5 mm; average pore diameter: 1.0 μm) was immersed in ethanol (purity: 99.5 volume %) for 10 minutes. After this immersion in ethanol, 0.2 g of the zeolite seed crystals obtained as described above were rubbed onto an outer surface of the wetted porous support and were then dried for 12 hours in an 80° C. dryer to adhere and fix the zeolite seed crystals to the surface of the porous support.

<Production of Aqueous Sol for Porous Separation Layer>

A magnetic stirrer was used to mix 17.63 g of tetrapropylammonium hydroxide aqueous solution (produced by Tokyo Chemical Industry Co., Ltd.) of 22.5 mass % in concentration (3.97 g in terms of tetrapropylammonium hydroxide as structure directing agent) and 210.45 g of ultrapure water at room temperature for 10 minutes. In addition, 22.12 g of tetraethoxysilane (produced by Sigma-Aldrich) was added as a silica source and was mixed therewith at room temperature for 60 minutes by the magnetic stirrer to produce an aqueous sol for porous separation layer formation. The composition of the aqueous sol, as a molar ratio, was tetraethoxysilane:tetrapropylammonium hydroxide:water=1:0.2:117.

<Separation Layer Formation Step>

The aqueous sol for a porous separation layer obtained as described above was loaded into a stainless steel pressure-resistant vessel. Next, the porous support having the zeolite seed crystals adhered thereto was immersed in the aqueous sol for a porous separation layer, and a reaction (hydrothermal synthesis) was carried out for 72 hours in a 185° C. hot-air dryer to form a porous separation layer on the porous support. The porous support having the porous separation layer formed thereon was subjected to two repetitions of boil washing for 1 hour using distilled water as a washing liquid. Thereafter, the porous support having the porous separation layer formed thereon was dried for 12 hours using an 80° C. thermostatic dryer. Next, firing was performed to remove structure directing agent (tetrapropylammonium hydroxide) contained in the porous separation layer and thereby obtain a separation membrane. The firing conditions were a heating rate of 0.25° C./min, a firing temperature of 500° C., a firing time (holding time) of 20 hours, and a cooling rate of 0.38° C./min.

The thickness of the porous separation layer in the resultant separation membrane was measured. Moreover, X-ray diffraction measurement of the porous separation layer was performed to obtain an X-ray diffraction pattern. As a result, the porous separation layer was confirmed to contain an MFI-type zeolite based on the obtained X-ray diffraction pattern.

<Membrane Separation Test>

The separation membrane obtained as described above was subjected to a membrane separation test using a test apparatus 1 illustrated in FIG. 1.

[Test Apparatus]

The test apparatus 1 illustrated in FIG. 1 includes a feedstock tank 2, a liquid feed pump 3, a first heat exchanger 4, a separator 5, and a second heat exchanger 7. The separator 5 is configured by setting up the separation membrane obtained as described above in a circular tube. The test apparatus 1 illustrated in FIG. 1 also includes a cold trap 6 and a sampling cold trap 13 that are connected to the separator 5 via a three-way valve 10, and a vacuum pump 11 that is connected downstream of the cold trap 6 and the cold trap 13 via a three-way valve 14. Moreover, the test apparatus 1 includes a sampling valve 12 between the feedstock tank 2 and the liquid feed pump 3, and a back pressure valve 8 and a pressure gauge 9 downstream of the separator 5.

In the test apparatus 1 illustrated in FIG. 1, a feedstock loaded into the feedstock tank 2 is fed to the first heat exchanger 4 by the liquid feed pump 3 and is heated to a temperature at least as high as the temperature at which the feedstock vaporizes. The vaporized feedstock is fed to the separator 5 as a gas phase and then undergoes separation (membrane separation) of components by the separator 5 including the separation membrane. In the test apparatus 1, the vacuum pump 11 is used to maintain a reduced pressure state at the permeate side of the separation membrane. A permeate that has passed through the separation membrane is fed to the cold trap 6 or sampling cold trap 13 connected via the three-way valve 10. On the other hand, a retentate that has not passed through the separation membrane in the separator 5 is condensed through cooling by the second heat exchanger 7 and is returned to the feedstock tank 2. Note that back pressure in the test apparatus 1 is adjusted by the back pressure valve 8 and the pressure gauge 9 provided downstream of the separator 5. In the test apparatus 1, a permeate that has passed through the separation membrane in the separator 5 can be extracted as a permeate side sample through switching of the three-way valves 10 and 14.

[Membrane Separation]

The membrane separation test was implemented as follows using the test apparatus 1 illustrated in FIG. 1.

Specifically, a C5 hydrocarbon mixture (C5 fraction) containing linear, branched, and cyclic hydrocarbons having a carbon number of 5 was first loaded into the feedstock tank 2 and was subjected to a degassing operation three times. Thereafter, a feedstock circulation process was initiated in which the hydrocarbon mixture was fed as a liquid phase by the liquid feed pump 3 to the separator 5, via the first heat exchanger 4, which was heated to 70° C., and was then cooled by the second heat exchanger 7 and returned to the feedstock tank 2. After the feedstock circulation process had been initiated, operation was continued until the temperature of the system reached a steady state. Once the temperature of the system reached a steady state, the back pressure valve 8 was used to increase the pressure at the retentate side to 180 kPa and the vacuum pump 11 was operated to reduce the pressure at the permeate side (cold trap 6 and cold trap 13) to −100 kPa. After a stable temperature and pressure had been confirmed in the system, the three-way valve 10 at the permeate side was opened to start the membrane separation test. In other words, the membrane separation test was performed at a temperature of 70° C. and with a pressure difference between the retentate side and the permeate side of 280 kPa.

Extraction of a sample at the permeate side was started after 5 minutes had passed from the start of the membrane separation test. Specifically, the three-way valves 10 and 14 were used to switch the flow path at the permeate side from the cold trap 6 to the sampling cold trap 13, and a permeate side sample was captured in the sampling cold trap 13 as a condensate to extract the sample. The sampling time during this was set as 10 minutes. The weight of the permeate side sample (condensate) was measured, and the molar ratio of a linear component with a branched component and a cyclic component was measured by a gas chromatograph. These measurement results were used to evaluate separation performance of the separation membrane at a point 10 minutes after the start of the membrane separation test. The results are shown in Table 1.

A sample was also taken after 1 hour had passed from the start of the membrane separation test by the same procedure as described above. The sample that was taken was also analyzed in the same manner to evaluate separation performance at a point 1 hour after the start of the membrane separation test. The results are shown in Table 1.

Comparative Example 1

A separation membrane was produced and evaluated in the same way as in Example 1 with the exception that ultrapure water was used instead of ethanol in the seed crystal adhesion step. The results are shown in Table 1. It was confirmed that the porous separation layer of the separation membrane contained an MFI-type zeolite as a result of X-ray diffraction measurement of the porous separation layer.

TABLE 1

| | | | Example 1 | Comparative Example 1 |
|---|---|---|---|---|
| Seed crystals | Average particle diameter (nm) | | 400 | 400 |
| Solvent | Type | | Ethanol | Water |
| | Contact angle with stainless steel (°) | | 13.5 | 97.8 |
| | Purity (volume %) | | 99.5 | 100 |
| Porous support | Material | Type | SUS304 | SUS304 |
| | Contact angle with water (°) | | 97.8 | 97.8 |
| | Average pore diameter (μm) | | 1.0 | 1.0 |
| | Seed crystal adhesion method | | Rubbing | Rubbing |
| Separation performance | After 10 minutes | Separation factor α (−) | 42.5 | 5.4 |
| | | Permeation flux F. (kg/(m² · h)) | 4.4 | 1.7 |
| | | F. × α (kg/(m² · h)) | 186.4 | 9.2 |
| | After 1 hour | Separation factor α (−) | 42.9 | 5.6 |
| | | Permeation flux F. (kg/(m² · h)) | 4.1 | 1.9 |
| | | F. × α (kg/(m² · h)) | 175.9 | 10.5 |

In the seed crystal adhesion step of Example 1 in which ethanol was used as a solvent, the time required for the step, inclusive of immersion time of the porous support in the solvent, etc., was roughly the same as a conventional seed crystal adhesion method in which water is used. Consequently, it can be seen that according to the present disclosure, it is possible to produce a separation membrane that can display the separation performance shown in Table 1 without complicated operations and without the need for long treatment time because a porous support is used without being acid treated.

In contrast, it was not possible to produce a separation membrane that can display adequate separation performance in Comparative Example 1 in which a conventional seed crystal adhesion method using water was performed with respect to a porous support formed of stainless steel.

INDUSTRIAL APPLICABILITY

According to the present disclosure, it is possible to provide a method of producing a separation membrane that does not require complicated operations and long treatment time and that enables production of a separation membrane that includes a porous support formed of stainless steel and that has excellent separation performance.

REFERENCE SIGNS LIST 1 test apparatus
2 feedstock tank
3 liquid feed pump
4 first heat exchanger
5 separator
6 cold trap
7 second heat exchanger
8 back pressure valve
9 pressure gauge
10, 14 three-way valve
11 vacuum pump
12 sampling valve
13 sampling cold trap

The invention claimed is:

1. A method of producing a separation membrane comprising:
a seed crystal adhesion step of adhering zeolite seed crystals to a porous support formed of stainless steel to obtain a seed crystal-bearing support; and
a separation layer formation step of forming a porous separation layer formed of a zeolite on the seed crystal-bearing support, wherein
the stainless steel has a contact angle with water of 90° or more, and
the seed crystal adhesion step includes bringing the zeolite seed crystals and a solvent having a contact angle with the stainless steel of 30° or less into contact with the porous support.

2. The method of producing a separation membrane according to claim 1, wherein the porous support is wetted with the solvent, and the zeolite seed crystals are subsequently rubbed against the porous support to obtain the seed crystal-bearing support in the seed crystal adhesion step.

3. The method of producing a separation membrane according to claim 1, wherein the porous support and a slurry composition containing the zeolite seed crystals and the solvent are brought into contact to obtain the seed crystal-bearing support in the seed crystal adhesion step.

4. The method of producing a separation membrane according to claim 1, wherein the solvent includes an alcohol having a carbon number of 5 or less.

5. The method of producing a separation membrane according to claim 1, wherein the solvent has a purity of 95 volume % or higher.

\* \* \* \* \*